United States Patent [19]
Felice

[11] Patent Number: 4,522,926

[45] Date of Patent: Jun. 11, 1985

[54] ALUMINUM RESISTANT REFRACTORY COMPOSITION

[75] Inventor: Frank T. Felice, Norristown, Pa.

[73] Assignee: Combustion Engineering, Inc., Windsor, Conn.

[21] Appl. No.: 474,083

[22] Filed: Mar. 10, 1983

[51] Int. Cl.$^3$ .................. C04C 35/10; C04C 35/04; C04C 35/12; C04C 35/14

[52] U.S. Cl. ............................. 501/127; 106/84; 106/85; 501/111; 501/114; 501/117; 501/120; 501/124; 501/128; 501/130; 501/132; 501/133; 501/155

[58] Field of Search .............. 501/114, 111, 117, 120, 501/127, 128, 130, 155, 124, 132, 133; 106/85, 84

[56] References Cited

U.S. PATENT DOCUMENTS

| | | | |
|---|---|---|---|
| 2,997,402 | 8/1961 | McDonald et al. | 501/132 |
| 3,471,306 | 10/1967 | Rubin et al. | 501/125 |
| 4,088,502 | 5/1978 | LaBar | 501/124 |
| 4,126,474 | 11/1978 | Talley et al. | 501/125 |
| 4,158,568 | 6/1979 | LaBar | 501/124 |
| 4,246,035 | 1/1981 | Maczura et al. | 501/124 |
| 4,348,236 | 9/1982 | Hines, Jr. et al. | 501/124 |

*Primary Examiner*—Mark L. Bell
*Attorney, Agent, or Firm*—Richard H. Berneike

[57] ABSTRACT

A refractory composition for use in contact with molten aluminum alloys containing a refractory aggregate, a binder and $9Al_2O_3 \cdot 2B_2O_3$. The aluminum borate may be of the type produced as a by-product in the production of ferro-boron alloys and known as aluminum boron slag.

6 Claims, No Drawings

ALUMINUM RESISTANT REFRACTORY COMPOSITION

BACKGROUND OF THE INVENTION

This invention relates to refractory compositions for use in contact with molten aluminum alloys.

Refractory materials that come into direct contact with molten aluminum alloys, such as those used in aluminum melting furnaces, remelting furnaces, ladles, troughs, etc. are subject to disruptive attack, penetration, and adherance by various alloying elements, and by dross formed on the surface of the melt.

Historically, refractories used for these applications, mostly fired brick and phosphate bonded moldable refractories, were found to hold up to molten alloy for reasonable periods of time because the operating temperatures were kept relatively low and the alloys used were relatively mild. The refractory grains and binders used in these products were generally based on refractory materials designed for other industries, however, and these materials are not intrinsically resistant to reaction under aluminum melting and holding conditions. Procedures in the aluminum industry are changing, with increased emphasis on throughput rates and more severe alloys, with the result that the older refractories are becoming borderline in their acceptability.

There have been attempts made from time to time to improve the resistance of refractories to attack by molten aluminum alloys by the use of additive materials. McDonald, for example, in U.S. Pat. No. 2,997,402 describes the production of a glassy frit containing 15 percent to 80 percent boron oxide, 5 percent to 50 percent calcium oxide, and 2 percent to 60 percent aluminum oxide, and the production of a fired shape by blending the described frit with an aggregate, pressing and firing. Rubin, et al., in U.S. Pat. No. 3,471,306 improved upon this scheme by using similar ranges of ingredients, but forming the protective glassy frit in situ by virtue of the ingredients being in a reactive form. Both the McDonald and Rubin patents describe the production of brick that are bonded by a glassy material. The implications of a continuous glassy phase through a refractory are reduced refractoriness and decreased thermal shock resistance.

LeBar, in U.S. Pat. Nos. 4,088,502 and 4,158,568, describes the use of zinc borosilicate frit as an additive in calcium aluminate cement bonded silica and alumina based refractories to render them resistant to aluminum alloy attack. Maczura et al., in U.S. Pat. No. 4,246,035 uses this same additive, with the further addition of boric acid, in a high purity mortar to achieve resistance. While the use of zinc borosilicate frit is effective, the cost of commercially available material is higher by an order of magnitude than the additive of the invention described hereinafter, and its refractoriness is lower.

In U.S. Pat. Nos. 4,126,474, Talley, et al., described the use of $BaSO_4$ as an additive to render various types of refractory resistant to molten aluminum attack. A potential drawback to the use of this additive material is that, since most barium salts are toxic, care must be exercised to establish that conditions are not present in which the non-toxic $BaSO_4$ will decompose to form soluble barium compounds, or, if they are formed, that the refractory is subjected to hazardous waste disposal procedures after use.

SUMMARY OF THE INVENTION

An object of the present invention is to provide refractory materials which will not be wetted and attacked by molten aluminum alloys. The refractory materials comprise mixtures of refractory grain or aggregate, an additive material containing primarily corrundum and aluminum borate, and a refractory binder or cement chosen from among those common to the refractories industry. The additive is crystalline, does not provide the bond of the refractory and, therefore, does not have the disadvantages found when there is a continuous glassy phase present.

DESCRIPTION OF THE PREFERRED EMBODIMENTS

In a search for refractory materials compatible with the new, more severe aluminum alloys and operating conditions, an essentially non-reactive material was found. This material, referred to herein as "aluminum boron slag" is a by-product of the production of ferro-boron.

Ferro-boron is an alloy of boron and iron that is used as an additive to some steels to increase their boron level, and thereby their capacity for being thermally hardened. Ferro-boron is produced by the aluminothermic reduction of iron oxide and boron oxide by aluminum metal at elevated temperatures. As the reduction proceeds, the molten iron and boron combine and fall to the bottom of the reaction vessel. After cooling, the solidified mass contains a lower portion composed of ferro-boron which is crushed and sold. The upper portion of the mass is composed of essentially aluminum oxide, boron that has reacted with it, and some residual slag modifiers depending on the exact process used. The upper portion of the mass, aluminum boron slag, is a waste material and is generally discarded.

An object of this invention is to take advantage of the unexpected non-wetting properties of this waste material by aluminum alloys when it is used as a refractory additive. In the absence of a ready source, it is possible to synthetically produce this slag material. A synthetic aluminum-boron slag is claimed to fall within the bounds of this invention. A requirement of such synthetic slag would be that substantial amounts of aluminum borate ($9Al_2O_3.2B_2O_3$) be present as the active ingredient.

The minerology of a typical aluminum boron slag as used in this invention was shown by X-ray diffraction determination to be predominantly aluminum borate ($9Al_2O_3.2B_2O_3$) and corrundum ($Al_2O_3$), with minor amounts of access ory minerals such as calcium floride ($CaF_2$), calcium aluminum borate ($CaAl_2B_2O_3$), and traces of some calcium aluminate phases. It is understood, and will be demonstrated later in this description, that the active phase is the aluminum borate, and the other phase may vary in concentration or be eliminated entirely without effecting the ability of the slag to protect refractory materials from attack by molten aluminum alloys. It is essential that the aluminum borate be in the crystalline form $9Al_2O_3.2B_2O_3$ which is the most refractory of the possible combinations of $Al_2O_3$ and $B_2O_3$. Therefore, the $B_2O_3$ content is limited relative to the $Al_2O_3$ content so that there is little or no excess $B_2O_3$ to combine into other forms of aluminum borate. Furthermore, since the aluminum borate is in the crystalline form as compared to the prior art where it is non-crystalline, it is not present as a glassy phase at the use temperature of aluminum contact refractories which would result in reduced refractoriness and decreased thermal shock resistance.

A typical chemistry of the slag in weight percent is as follows:

| | |
|---|---|
| $Al_2O_3$ | 85.5 |
| $B_2O_3$ | 6.0 |
| $SiO_2$ | 0.9 |
| $CaO$ | 3.1 |
| $MgO$ | 0.6 |
| $K_2O$ | 0.4 |
| $Na_2O$ | 1.1 |
| $Fe_2O_3$ | 0.9 |
| $CaF_2$ | 1.5 |

The composition range for the slag may vary. The boron level (expressed as $B_2O_3$) should be kept above about 4 percent. The iron (expressed as $Fe_2O_3$) is present as an impurity but can vary up to about 4 percent with little problem while the fluoride, also an impurity (expressed as $CaF$) should be kept as low as possible and not over 2 percent because of possible adverse effects on some bond phases during curing. Alkali and alkali earths ($Ca^{++}$, $Mg^{++}$, $Na^+$, and $K^+$) being necessary and undesirable constituents, should be kept as low as possible because of the negative effect on the refractoriness of the additive. It is understood that a synthesized boron slag is possible, and that such synthesized slag can contain up to 100 percent aluminum borate. The sizing of the slag can vary between wide limits and still be effective, such as from about 6 mesh to about 320 mesh. All references herein are to Tyler screen size. A more satisfactory range is between 10 and 100 mesh with the preferred range being between about 30 mesh and 70 mesh.

A variety of commonly used refractory mixtures can be rendered resistant to molten aluminum alloys by incorporating a quantity of aluminum boron slag into their formulation. Specific examples will now be described relating to castable and moldable (plastic and ramming) mixes but it is to be understood that these are merely by way of example.

A castable refractory mixture according to the present invention can be marketed either as a bagged castable material suitable for on-site installation and curing, or as precast and cured shapes. Castable formulations can utilize refractory aggregations such that the products will be light weight or high density as desired. A castable formulation expressed in weight percent is as follows:

| | Range | Preferred |
|---|---|---|
| Refractory Aggregate | 45–85 | 65 |
| Calcium Aluminate Cement | 10–40 | 25 |
| Aluminum Boron Slag, or | 2–20 | 10 |
| Aluminum Borate | 1–12 | 5 |

A wide range of refractory aggregates may be used in the present invention such as chrome ore, bauxite, tabular alumina, silica, spinel, magnesia-chrome, mullite and other alumino-silicates expanded clay and expanded shale. In fact, any aggregate that is compatible with the chosen binder system may be used. Blends of aggregates can also be used such as less expensive reactive aggregates used as the course fraction with the more expensive, less reactive aggregates forming the matrix. Fibrous materials may also be included in the mixture.

The aggregate sizing is not critical to the present invention and is generally as known in the industry for formulating castable mixes. The aggregate sizing can be varied to achieve specific physical properties such as high strength or spall resistance. Following is a typical aggregate sizing:

| Size Range | Percent by Weight |
|---|---|
| −3 + 8 mesh | 26 |
| −8 + 20 mesh | 37 |
| −20 + 100 mesh | 25 |
| −100 mesh | 13 |

The following two examples illustrate the effect of aluminum boron slag on the aluminum alloy resistance of castable mixtures.

EXAMPLE 1

65 weight percent of calcined bauxite graded 3 mesh by finer was blended with 25 percent of calcium aluminate cement and 10 percent of aluminum boron slag. To this mixture was added 7 percent water, and the mixture was cast into the form of a brick shape 9"×4¼"×2½" deep with a cavity 1¼" deep at its center. A second cup was cast in the same way from a mixture similar to the above but excluding the aluminum-boron slag. Both samples were fired to 1700° F. for 5 hours and tested for metal resistance by placing 7075 alloy (a standard alloy of the "Aluminum Association Incorporated") into their interior cavities and holding at 1500° F. for a period of 72 hours. After this period the cups were sectioned and visually examined. The sample containing aluminum-boron slag was completely free of any reaction or penetration by the aluminum alloy, and the aluminum metal could be peeled cleanly away from its surface. The sample without aluminum-boron slag was reacted to a depth of up to one inch such that the solidified aluminum and dross could not be removed from its surface without damage to the refractory.

EXAMPLE 2

A mixture was blended of 60 weight percent of tabular alumina grain graded ¼" by finer, 25 percent of calcium aluminate cement and 15 percent of aluminum-boron slag. A second sample was prepared as above but excluding the aluminum boron slag. Both samples were treated and tested as in Example 1. The sample without aluminum boron slag was penetrated to a depth of about 1/16" and the aluminum metal could not be removed from its surface without damage to the refractory. The sample containing aluminum boron slag appeared unaffected, with the aluminum metal peeling cleanly away from its surface without damage.

EXAMPLE 3

70 weight percent of chrome ore graded 4M by finer was blended with 20 percent of calcium aluminate cement and 10 percent of aluminum boron slag. A sample cup of this mix was prepared and tested as in Example 1 along with a second sample without the slag additive. The results were similar to the proceeding examples with the metal peeling easily off of the slag containing body, while being firmly attached to the body that did not contain aluminum-boron slag.

Moldable refractories such as plastics and ramming mixes are also improved in their resistance to aluminum alloys by the addition of aluminum boron slag to their formulation. Moldable refractories are marketed in a pre-moistened form as slabs in the case of plastics and granulated in the case of ramming mixes. Moldable refractories are installed by deforming or consolidating the damp refractory with rammers to form a monolithic furnace lining which is then dried and fired in place. Plastics and ramming mixes differ from one another in that plastics have more liquid added. A general formulation in weight percent for moldable refractories using the additive of this invention follows:

|  | Range | Preferred |
|---|---|---|
| Aggregate | 30–70 | 55 |
| Matrix Fines | 20–40 | 30 |
| Clay | 2–20 | 8 |
| Binder | 3–8 | 5 |
| Aluminum Boron Slag | 5–20 | 12 |
| Water (as required for desired consistency) | | |

The total amount of aggregate plus matrix fines comprises 50 to 90 percent of the mixture and the clay serves as a binder as well as a plasticizer. Following is an example of one such plastic refractory using the present invention:

EXAMPLE 4

50 weight percent of calcined bauxite graded 6 mesh and finer was blended with 20 percent of fine alumina, 5 percent of plastic clay, 5 percent of aluminum phosphate binder, and 12 percent of aluminum boron slag. About 6 percent water was added to achieve a plastic consistency. A second, similar plastic mixture was made, but without the addition of aluminum boron slag. The two mixtures were formed into a cup shape by pressing, dried at 230° F., fired at 1700° F., and tested for resistance to molten aluminum alloy as described in Example 1 except that the test duration was extended to 144 hours. After this period, the cups were sectioned and visually examined. The sample without alumina boron slag was found to be reacted to a depth of about 1/16" on its bottom, and its ½" thick sides were completely reacted with the aluminum alloy. The sample containing aluminum boron slag showed no visible reaction with the alumina alloy.

As is the case with the castable version of this invention, other aggregates can be used with the only stipulation being that they be compatible with the binder system used. Some binders with potential use in moldables would include clays, aluminum phosphate, phosphoric acid, and various silicate and alkali silicate binders.

As was described earlier, a synthesized version of aluminum boron slag is possible containing up to 100 percent aluminum borate. Following are two examples of refractory products produced using one such synthesized material.

EXAMPLE 5

80 percent by weight of fine hydrated alumina was dry blended with 20 percent by weight of boric acid and the mixture was dry pressed into pellets. The pellets were fired to 2020° F. for 10 hours, cooled, and ground to minus 70 mesh. Mineralogical examination of the resulting powder by X-ray diffraction showed it to be composed almost entirely of aluminum borate ($9Al_2O_3.2B_2O_3$). A bauxite based castable mixture was made and tested as in Example 1, but using 10 weight percent of the above synthesized slag in place of the by-product slag. The tested sample exhibited the same non-wetting and lack of penetration or reaction as did the cup containing the by-product version of the slag.

EXAMPLE 6

A quantity of synthesized aluminum boron slag was produced as in Example 5 above. A plastic refractory was produced as in Example 2 but in place of the 10 percent aluminum boron slag by-product there was added 10 percent of the synthesized aluminum boron slag which had been determined to be essentially 100 percent aluminum borate. The refractory plastic, which was composed of bauxite grain with a matrix of clay, fine alumina, aluminum phosphate binder, and synthesized aluminum boron slag, was formed into a test cup, cured, fired to 1700° F. for 5 hours, and tested for resistance to 7075 aluminum alloy for 144 hours as described in Example 2.

Visual examination after the test period revealed this sample containing 10 percent synthesized aluminum boron slag (100 percent aluminum borate) to be virtually identical to the sample in Example 2 containing 10 percent by-product slag, i.e., the test sample showed no evidence of reaction or penetration by the aluminum alloy. This is in contrast to the heavy penetration and reaction described in Example 2 when no additive was added to an otherwise identical formulation.

It is apparent from the above examples that the incorporation of aluminum-boron slag to refractory formulations has the effect of rendering the samples resistant to reaction with molten aluminum alloys under the test conditions described.

I claim:

1. A refractory composition resistant to attack by molten aluminum alloys consisting essentially of:
   a. 45 to 90 weight percent refractory aggregate particles compatible with the selected refractory binder,
   b. 3 to 40 weight percent refractory binder selected from the group consisting of calcium aluminate cement, aluminum phosphate, phosphoric acid, alkali silicates and clay, and
   c. an additive consisting essentially of crystalline $9Al_2O_3.2B_2O_3$ such that the refractory composition contains 1 to 12 percent $9Al_2O_3.2B_2O_3$ by weight.

2. A refractory composition as recited in claim 1 wherein said refractory particles are selected from the group consisting of chrome ore, bauxite, tabular alumina, silica, spinel, magnesia-chrome, mullite, and expanded clay and shale.

3. A refractory composition as recited in claim 1 wherein said additive comprises aluminum boron slag.

4. A refractory composition as recited in claim 3 wherein said aluminum boron slag is synthetically produced.

5. A refractory composition as recited in claim 3 wherein said aluminum boron slag comprises primarily aluminum oxide with at least about 4 percent $B_2O_3$.

6. A refractory composition as recited in claim 3 wherein said refractory particles are selected from the group consisting of chrome ore, bauxite, tabular alumina, silica, spinel, magnesia-chrome, mullite, and expanded clay and shale.

* * * * *